Patented Mar. 29, 1949

2,465,875

UNITED STATES PATENT OFFICE 2,465,875

PREPARATION OF DRIED PROTEIN PRODUCTS

Ervin W. Hopkins, Hinsdale, Ill., assignor to Armour and Company, Chicago, Ill., a corporation of Illinois No Drawing. Application December 1, 1944, Serial No. 566,235

5 Claims. (Cl. 99—210)

This invention relates to dried protein products, more particularly dried egg whites and dried whole eggs, and a method for the preparation thereof.

In the preparation of dried egg whites and dried whole eggs from acidic egg liquids, for example, by processes in which the egg whites or whole eggs are fermented prior to drying, it is desirable to neutralize the fermented mixture. Neutralization processes as heretofore practiced, however, have been attended by certain disadvantages. If sodium bicarbonate is added to neutralize the fermented mixture and the resultant eggs liquid dried, the reconstituted product, that is the product made by reconstituting the dried egg with water, will have a pH higher than that of the egg liquid before drying. On the other hand, when the egg liquid is neutralized with ammonium hydroxide and dried, the reconstituted product is not neutral but has substantially the same pH as the liquid before neutralization.

In the use of sodium bicarbonate for neutralizing, the high alkalinity upon drying is apparently due to the fact that sodium bicarbonate reacts with the organic acids present, such as lactic acid, to form sodium salts and liberate carbon dioxide, but these salts are decomposed by the heat of the drier with the formation of sodium carbonate having a pH substantially above the neutral point, say around pH 10. Thus the dried egg product instead of being neutral, as might be expected, has a relatively high alkalinity and is unsuitable for some purposes. Also, the palatability of the product is affected.

When the neutralization is carried out with ammonia, the ammonia apparently forms ammonium salts with the acids present in the egg liquid and reacts also with the proteins present. The ammonium salts and protein reaction products, when heated, liberate free ammonia, hence the effect of the neutralization is destroyed during drying and the dried product, when reconstituted, has substantially the same pH as the egg liquid before the ammonia was added.

The foregoing processes leave much to be desired, and may have one or more of the following adverse effects, namely denaturization of the proteins due to excessive alkalinity or acidity during drying, a resultant decrease in the solubility of the proteins, bad odors and poor flavors in the resultant product, and the production of products which when reconstituted are either too highly alkaline or too highly acid.

One object of the present invention is to provide a new and improved method for adjusting the pH of acidic protein-containing liquids prior to drying, and more particularly for adjusting the pH of liquid egg whites and whole eggs.

Another object of the invention is to provide a new and improved method of neutralizing, or substantially neutralizing egg liquids, in such a manner that the egg liquid is not exposed to the heat of drying at either a low pH or high pH.

Still a further object of the invention is to provide a new and improved method for treating egg liquids prior to drying characterized by the fact that bad odors and flavors are not produced during the drying processes.

An additional object of the invention is to provide a new and improved method for preparing dried egg products wherein the dried egg products when reconstituted have a predetermined pH depending upon the purpose for which the products are to be employed. Other objects will appear hereinafter.

In accordance with the invention, it has been found that new and improved results in the preparation of dried protein liquids of acidic nature, for example, egg liquids, are obtained by adjusting the pH of such liquids prior to drying with a non-volatile alkali and a volatile alkali. In the practice of the invention it is preferable to employ sodium bicarbonate as the non-volatile alkali and ammonium hydroxide as the volatile alkali, the non-volatile alkali preferably being added first in the neutralization process.

By following this procedure of neutralization, dried whole egg products can be obtained, which on being reconstituted, have a pH near the neutral point, that is approximately pH 7.0. The same is true with respect to other egg products, such as dried egg whites, although in this case the pH of the dried product may be varied somewhat depending upon the use for which the product is intended, an acid product being preferable for some uses and a neutral one for others.

The practice of the invention makes it possible to predetermine the pH of the dried egg product by adjusting the quantities of the non-volatile alkali and of the volatile alkali. Likewise, the invention makes it possible to dry the egg liquids within pH ranges that are not too high or too low, thereby decreasing the denaturing effect. At the same time, any objectionable odors and flavors are more completely removed during the drying process than in ordinary practices. This is particularly true in the drying of fermented egg whites or whole eggs, to which the invention is especially applicable.

The invention will be further illustrated but is not limited by the following examples.

Example I

A liquid egg white was prepared containing 10,710 pounds of egg white. Hydrochloric acid was added until the pH was 5.6. This mixture was then inoculated with 1% of a culture of *Streptococcus lactis* and fermentation was carried out for a period of 52 hours at an incubation temperature of 21 to 26 degrees C. After fermentation the mixture had a pH of 4.5. Sodium bicarbonate was added to adjust the pH to 5.65. Ammonium hydroxide was then added to adjust the pH to 8.05 and the resultant egg white liquid was dried in a conventional manner. The pH of the reconstituted egg white was 6.00.

In a similar manner, by partial neutralization with sodium bicarbonate, but to a somewhat high pH, say between pH 6 and pH 6.5, followed by the addition of ammonia, a dried egg white can be obtained having a pH closer to the neutral point.

The invention is also similarly applicable to the treatment of fermented whole egg liquid prior to drying.

The following examples are given to illustrate the results obtained when egg liquids are neutralized entirely with a non-volatile alkali, such as sodium bicarbonate, or entirely with a volatile alkali, such as ammonium hydroxide.

Example II

An egg liquid consisting of 4,223 pounds of egg whites was prepared and hydrochloric acid was added to a pH of 5.5. The resultant mixture was then inoculated with 1% of a culture of *S. lactis* and was fermented for 50 hours at 24 to 28 degrees C. After fermentation the pH was 4.83. Sodium bicarbonate was added to a pH 7.05 and the egg white liquid was dried. The pH of the reconstituted dried egg white was 10.4.

This example illustrates, therefore, that the use of sodium bicarbonate alone as the neutralizing agent results in a product having an undesirably high pH when reconstituted. During the drying operation the pH increases which is undesirable because it tends to produce denaturization of the protein, discolorization, and a product of unsatisfactory quality.

Example III

A liquid whole egg mixture was prepared consisting of 588 pounds of whole eggs which had a pH of 7.6. This mixture was inoculated with 1% of a lactose broth culture of *S. lactis*. The mixture was held for 17 hours with no loss of sugar. The pH was adjusted to 6.8 with hydrochloric acid and the mixture was reinoculated with 1% of a culture of *S. lactis* and fermented for 21 hours at 14 to 18 degrees C. The pH after fermentation was 5.7. Ammonium hydroxide was added to a pH of 7.5 and the egg liquid was dried in a conventional manner. The pH of the reconstituted dried whole egg was 5.7.

This trial illustrates, therefore, that netralization with ammonia alone creates a condition in which the pH decreases during drying and the dried whole egg product has an undesirably low pH.

By employing a combination of a non-volatile and a volatile alkali, on the other hand, it is possible to control the pH both with respect to the pH during the drying operation and with respect to the dried product when reconstituted.

In a similar manner other non-volatile alkali substances may be employed instead of sodium bicarbonate. Mention may be made of sodium hydroxide, sodium carbonate, potassium hydroxide, potassium carbonate and potassium bicarbonate as suitable non-volatile alkalis for the purpose of the invention. Ammonia, either in gaseous or liquid form or in the form of an aqueous solution, is the most practical and convenient volatile substance, although other types of volatile alkaline compounds may be employed provided they are non-toxic and do not cause undesirable side reactions.

It is preferable to add the non-volatile alkali first in order that the residual titratable acidity can be determined and used as a measure of the amount required. However, if desired, the volatile alkali may be added first, followed by the non-volatile alkali. In either case, the amount of the non-volatile alkali should be such that the increase in pH due to the non-volatile alkali is less than that required to entirely neutralize the acids present. The final pH after the addition of the volatile alkali may vary depending upon the desired acidity or alkalinity of the resultant product but is preferably within the range of 7.0 to 8.5.

The adjustment of pH as herein described is not necessarily limited to fermented products. If some desirable change in the character of egg white, for example, were produced by acidification with or without further chemical or physical treatment, the process of adjusting the pH with a non-volatile and a volatile alkali prior to drying could still be employed advantageously.

Although the invention is especially applicable to the treatment of egg liquids, it can also be employed in conjunction with the preparation of other dried products from acidic liquids containing proteins. Typical examples are milk products, such as skim milk and especially whey, which contain both lactic acid and proteins. The process does not necessarily apply to all milk products because, as will be readily understood by those skilled in the art, if the milk is sufficiently fresh, it requires no neutralization. On the other hand, neutralization would be necessary if milk with any appreciable acidity were received for drying, whether dried directly or after preliminary concentration.

The invention provides a new and improved method for treating protein-containing liquids, such as egg liquids, prior to drying in order to obtain more satisfactorily dried products and to remove more completely any objectionable odors and flavors. It also provides a new and improved method for predetermining and controlling the pH or such products both with respect to the liquid during the drying operation and to the dried products. It provides a new and improved means for drying egg liquids so that they are not exposed to the heat of drying at either a low pH or a high pH.

The foregoing detailed description of my improved processes and products is given for the purposes of explanation and is not intended in a limited sense, it being understood that the improvements are subject to variations in practice in many different ways, all within the spirit of the invention.

I claim:

1. A method of preparing dried protein products containing lactic acid and protein which comprises partially neutralizing the lactic acid with a non-volatile alkali sufficient to adjust the pH to a point within the range of 5.65 to 6.5, adding a quantity of a volatile alkali at least sufficient to complete the neutralization but insufficient to produce a pH exceeding 8.5, and thereafter drying the resultant liquid at temperatures at which said volatile alkali is volatilized.

2. A process of preparing dried protein products from an acidic protein liquid containing lactic acid which comprises adding to said acidic liquid a quantity of a non-volatile alkali sufficient to partially neutralize the acidity of said liquid, said quantity of non-volatile alkali being equal to that required to adjust the pH of the liquid to a point within the range of 5.65 to 6.5, adding a quantity of ammonia sufficient to adjust the pH within the range from about 7.0 to about 8.5, irrespective of the order of addition of said alkali and ammonia, and then drying the resultant liquid.

3. In a method of preparing dried egg products from an acidic fermented egg liquid, the steps which comprise partially neutralizing the acidity of said egg liquid with sodium bicarbonate, the quantity of said bicarbonate being sufficient to adjust the pH within the range of 5.65 to 6.5, adding a sufficient amount of ammonia to adjust the pH within the range of about 7 to about 8.5, and then drying the resultant liquid.

4. In a method of preparing dried egg products from an acidic fermented whole egg liquid, the steps which comprise partially neutralizing the acidity of said whole egg liquid with sodium bicarbonate, the quantity of said bicarbonate being sufficient to adjust the pH within the range of 5.65 to 6.5, adding a sufficient amount of ammonia to adjust the pH within the range of about 7 to about 8.5, and then drying the resultant liquid.

5. In a method of preparing dried egg products from an acidic fermented egg white liquid, the steps which comprise partially neutralizing the acidity of said egg white liquid with sodium bicarbonate, the quantity of said bicarbonate being sufficient to adjust the pH within the range of 5.65 to 6.5, adding a sufficient amount of ammonia to adjust the pH within the range of about 7 to about 8.5, and then drying the resultant liquid.

ERVIN W. HOPKINS.

REFERENCES CITED

The following references are of record in the file of this patent:

UNITED STATES PATENTS

| Number | Name | Date |
|---|---|---|
| 1,996,801 | Fischer | Apr. 9, 1935 |
| 2,059,399 | Rosner | Nov. 3, 1936 |
| 2,189,380 | Littlefield | Feb. 6, 1940 |
| 2,237,087 | Littlefield | Apr. 1, 1941 |